(12) United States Patent
Maharyta

(10) Patent No.: US 10,162,467 B2
(45) Date of Patent: Dec. 25, 2018

(54) RATIOMETRIC MUTUAL-CAPACITANCE-TO-CODE CONVERTER

(71) Applicant: Cypress Semiconductor Corporation, San Jose, CA (US)

(72) Inventor: Andriy Maharyta, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/625,339

(22) Filed: Jun. 16, 2017

(65) Prior Publication Data

US 2018/0260076 A1 Sep. 13, 2018

Related U.S. Application Data

(60) Provisional application No. 62/468,656, filed on Mar. 8, 2017.

(51) Int. Cl.
G06F 3/041 (2006.01)
G06F 3/044 (2006.01)

(52) U.S. Cl.
CPC ............ G06F 3/0418 (2013.01); G06F 3/044 (2013.01)

(58) Field of Classification Search
CPC ................................ G06F 3/0418; G06F 3/044
USPC .......................................................... 324/678
See application file for complete search history.

(56) References Cited

U.S. PATENT DOCUMENTS

| | | | |
|---|---|---|---|
| 5,057,839 A | 10/1991 | Koch | |
| 6,970,126 B1* | 11/2005 | O'Dowd | H03M 3/34 341/143 |
| 7,683,641 B2 | 3/2010 | Hargreaves et al. | |
| 8,089,289 B1 | 1/2012 | Kremin et al. | |
| 8,436,263 B2* | 5/2013 | Kremin | H03K 17/962 345/173 |
| 8,928,622 B2 | 1/2015 | Wang et al. | |
| 9,154,160 B2* | 10/2015 | Kremin | G06F 3/0416 |
| 9,166,621 B2 | 10/2015 | Kremin | |

(Continued)

FOREIGN PATENT DOCUMENTS

WO 2016085760 A2 6/2016
WO 2016209803 A1 12/2016

OTHER PUBLICATIONS

"AN66271-CY8C21x34/B" CapSense Design Guide, Cypress Perform, Document No. 001-66271; 65 pages.

(Continued)

Primary Examiner — Melissa Koval
Assistant Examiner — Rahul Maini

(57) ABSTRACT

An embodiment of a capacitance sensing circuit includes a set of bridge switches coupled with a reference cell and a sensor cell. The set of bridge switches is configured to, over a first phase, increase a voltage difference between a first modulation capacitor and a second modulation capacitor, and over a second phase, decrease the voltage difference at a rate corresponding to a difference between a capacitance of the sensor cell and a capacitance of the reference cell. The capacitance sensing circuit also includes a comparator configured to generate an output based on comparing a first voltage of the first modulation capacitor with a second voltage of the second modulation capacitor, and initiate a transition between the first phase and the second phase in response to the comparing.

21 Claims, 9 Drawing Sheets

(56) References Cited

U.S. PATENT DOCUMENTS

| | | |
|---|---|---|
| 9,819,360 B1 | 11/2017 | Maharyta |
| 2008/0079444 A1 | 4/2008 | Denison |
| 2009/0208069 A1 | 8/2009 | Chuang et al. |
| 2012/0112947 A1* | 5/2012 | Krauss .................... H03M 1/60 341/172 |
| 2013/0314109 A1 | 11/2013 | Kremin et al. |
| 2015/0102951 A1* | 4/2015 | Watanabe ............. H03M 3/374 341/143 |
| 2015/0145801 A1 | 5/2015 | Angelini et al. |
| 2015/0338952 A1 | 11/2015 | Shahpamia et al. |
| 2016/0110020 A1 | 4/2016 | Lee et al. |
| 2017/0083146 A1 | 3/2017 | Yuan et al. |

OTHER PUBLICATIONS

International Search Report for International Application No. PCT/US2018/018831 dated May 3, 2018; 3 pages.
Written Opinion of the International Searching Authority for International Application No. PCT/US2018/018831 dated May 3, 2018; 6 pages.

* cited by examiner

RATIOMETRIC MUTUAL-CAPACITANCE-TO-CODE CONVERTER

RELATED APPLICATIONS

This application claims priority to U.S. Provisional Application No. 62/468,656, filed on Mar. 8, 2017, which is incorporated by reference herein in its entirety.

TECHNICAL FIELD

This disclosure relates to the field of capacitance sensing and, in particular, to capacitance-to-code converters.

BACKGROUND

Computing devices, such as notebook computers, personal data assistants (PDAs), kiosks, and mobile handsets, have user interface devices, which are also known as human interface devices (HID). One type of user interface device is a touch-sensor pad (also commonly referred to as a touchpad), which can be used to emulate the function of a personal computer (PC) mouse. A touch-sensor pad replicates mouse X/Y movement by using two defined axes which contain a collection of sensor electrodes that detect the position of one or more objects, such as a finger or stylus. The touch-sensor pad provides a user interface device for performing such functions as positioning a pointer, or selecting an item on a display. Another type of user interface device is a touch screen. Touch screens, also known as touchscreens, touch windows, touch panels, or touchscreen panels, are transparent display overlays that allow a display to be used as an input device, removing the keyboard and/or the mouse as the primary input device for interacting with the display's content. Other user interface devices include buttons, sliders, etc., which can be used to detect touches, taps, drags, and other gestures.

Capacitance sensing systems are increasingly used for implementing these and other types of user interface devices, and function by sensing electrical signals generated on electrodes that reflect changes in capacitance. Such changes in capacitance can indicate a touch event or the presence of a conductive object, such as a finger, near the electrodes. The capacitance changes of the sensing electrodes can then be measured by an electrical circuit that converts the capacitances measured from the capacitive sense elements into digital values to be interpreted by a host device. However, the accuracy of existing capacitance measurement circuits can be degraded by noise and fluctuations affecting the drive voltages, current source outputs, switching frequencies, and other signals within the measurement circuit. Such measurement inaccuracy can result in inaccurate positioning or touch detection in a capacitance-based user interface device.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the claimed subject matter. It will be apparent to one skilled in the art, however, that at least some embodiments may be practiced without these specific details. In other instances, well-known components or methods are not described in detail or are presented in a simple block diagram format in order to avoid unnecessarily obscuring the claimed subject matter. Thus, the specific details set forth are merely exemplary. Particular implementations may vary from these exemplary details and still be contemplated to be within the spirit and scope of the claimed subject matter.

In capacitive sensing applications, a baseline signal is a signal that is generated in a capacitance sensing circuit even when a desired input, such as a finger touch or the proximity of some conductive object, is not present at the electrodes being sensed. Such baseline signals can be affected by factors such as the power-supply voltage, clock frequency, reference voltage, and current digital-to-analog converter (IDAC) current of the capacitance-sensing circuit, and can also be affected by variations in sensor capacitance resulting from changes in temperature.

Capacitive sensing applications that demand low power consumption and high sensitivity are particularly intolerant of high variations in the baseline signal. Some capacitance sensing systems compensate for baseline variations by implementing a baseline tracking procedure in firmware that tracks variations in the baseline signal over time. However, such a solution may not be practical in low power capacitive sensing applications where processor support is limited. Furthermore, high-sensitivity capacitive sensing applications operate with a low signal-to-noise ratio (SNR), which can complicate baseline tracking firmware procedures.

One embodiment of a capacitance measurement circuit implements a ratiometric mutual-capacitance-to-code converter that combines characteristics of charge-transfer and differential sigma-delta converters and is insensitive to variations in clock frequency, IDAC current, supply voltage, and reference voltage and has high immunity to external noise. Such a capacitance measurement circuit generates an output bitstream having an average duty cycle that is directly proportional to the mutual capacitance of a sensor cell being measured.

Figure 1:
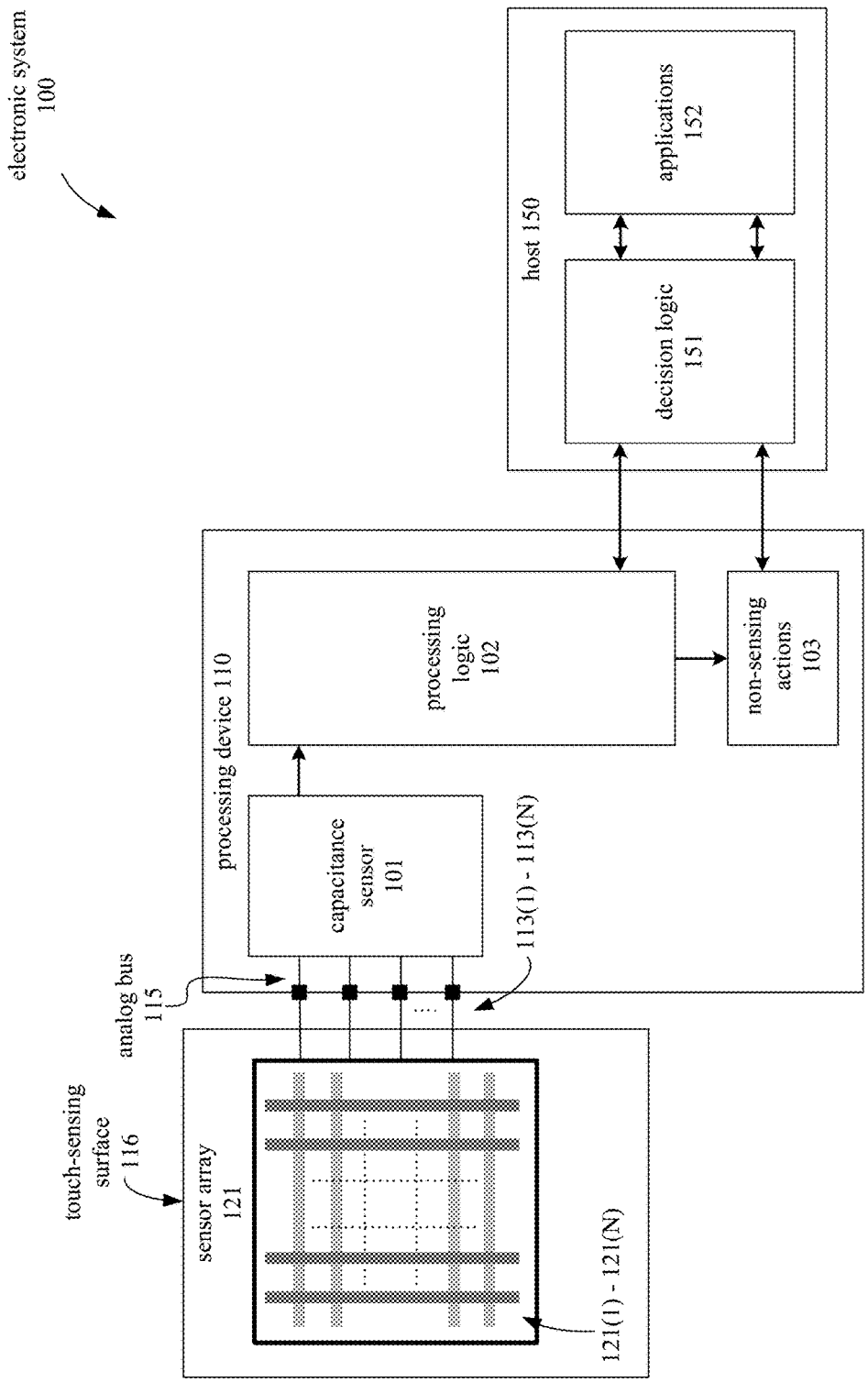
FIG. 1 is a block diagram illustrating an embodiment of an electronic system that measures capacitances.

FIG. 1 illustrates a block diagram of an electronic system 100 implementing a ratiometric mutual-capacitance-to-code converter in a capacitance sensor 101 for sensing capacitances of electrodes in capacitive sensor array 121, according to an embodiment. The electronic system 100 includes a touch-sensing surface 116 (e.g., fingerprint sensor, touch-screen device, touchpad, or other array-defined capacitance sensor) coupled to the processing device 110 and a host 150. In one embodiment, the touch-sensing surface 116 is a two-dimensional user interface that uses a sensor array 121 to detect touches or features on the surface 116.

In one embodiment, the sensor array 121 includes sensor electrodes 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor electrode 121(1)-121(N) is represented as a capacitor.

The capacitance sensor 101 includes circuitry for converting capacitances into measured values. The processing device 110 may further include software components to convert an output bitstream of the capacitance sensor 101 into a sensor electrode detection decision (also referred to as switch detection decision) or a digital value indicating a relative magnitude.

In one embodiment, the processing device 110 further includes processing logic 102. Operations of the processing logic 102 may be implemented in firmware; alternatively, it may be implemented in hardware (e.g., in dedicated logic) or software. The processing logic 102 may receive signals from the capacitance sensor 101, and determine the state of the sensor array 121, such as whether an object (e.g., a finger) is detected on or in proximity to the sensor array 121 (e.g., determining the presence of the finger), tracking the motion of an object based on the received signals, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2A:
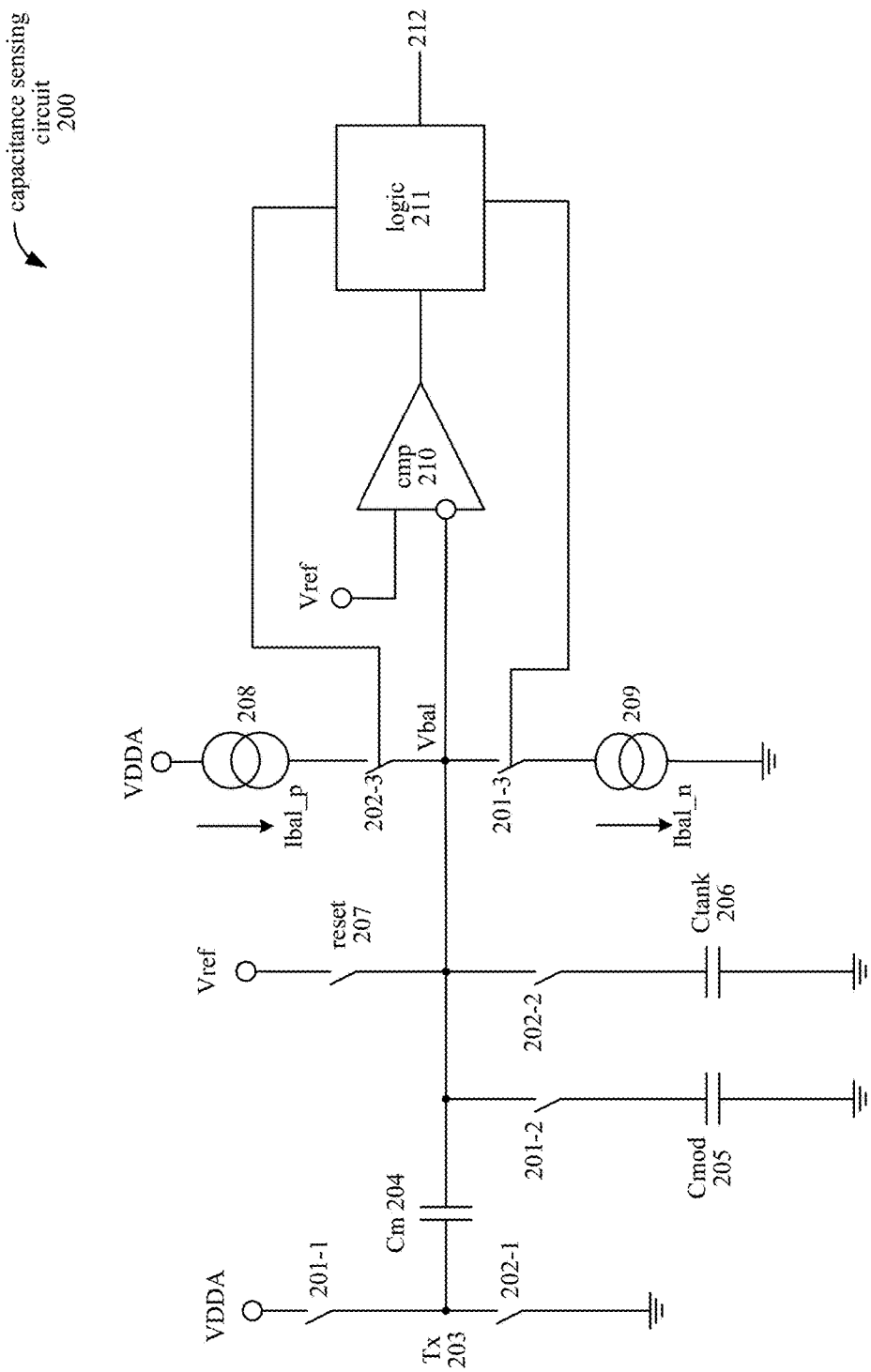
FIG. 2A illustrates an embodiment of a capacitance measurement circuit.

FIG. 2 illustrates a capacitance sensing circuit 200 for measuring mutual capacitance of a sensor cell, according to an embodiment. The mutual capacitance of a sensor cell may be the mutual capacitance between two intersecting sensor electrodes in the sensor array 121. A sensor cell may also be referred to as a unit cell of the sensor array 121. In the capacitance sensing circuit 200, this mutual capacitance is represented as Cm 204. The circuit 200 also includes capacitors Cmod 205 and Ctank 206, which can be implemented using fixed-value capacitors. During a reset phase, switches 201-2 and 202-2 are closed along with reset switch 207 so that both of the Cmod 205 and Ctank 206 capacitors are charged to the voltage Vref. During the measurement phase, the sensor cell capacitance Cm is used to alternately discharge the Ctank capacitor 206 and charge the Cmod capacitor 205. The switches 201-1, 201-2, and 201-3 (i.e., switches 201-X) are closed to charge Cmod 205 by applying the voltage VDDA to the Tx mode 203 and connecting Cm 204 to Cmod 205. Then, switches 201-X are opened and switches 202-1, 202-2, and 203-2 (i.e., switches 202-X) are closed to discharge Ctank 206 by connecting the Tx node 203 to ground while connecting Cm 204 to Ctank 206.

The current source 208 supplies a current Ibal_p to charge the Ctank capacitor 206, while the sink current source 209 sinks a current Ibal_n to reduce the charge stored in the Cmod capacitor 205. Voltage comparator 210 controls the switches 201-3 and 202-3 via logic 211 to interrupt the Ibal_p and Ibal_n currents if the voltage VCmod of the Cmod capacitor 205 or the voltage VCtank of the Ctank capacitor 206 are higher than Vref.

Figure 2B:
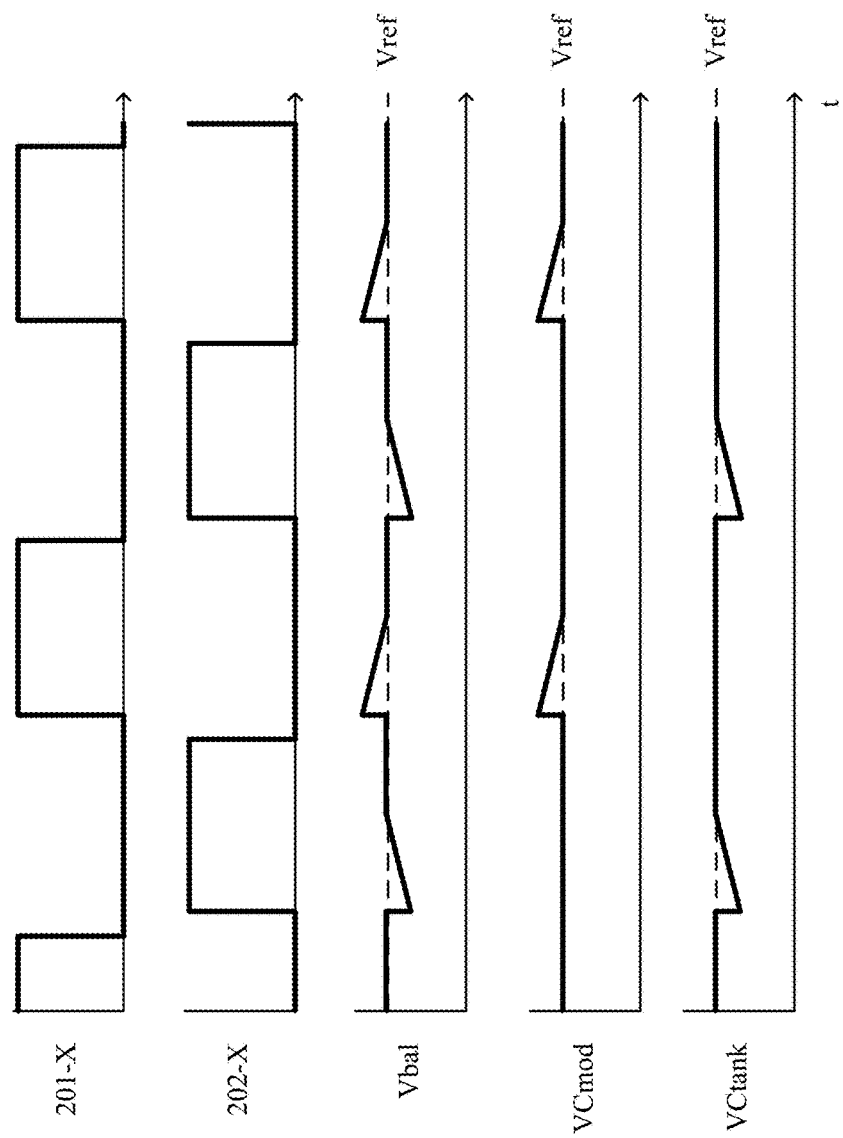
FIG. 2B is a timing diagram illustrating various signals in a capacitance measurement circuit, according to an embodiment.

FIG. 2B is a timing diagram illustrating signals at key nodes in the embodiment of the sensing circuit 200 illustrated in FIG. 1. As illustrated in FIG. 2B, complementary non-overlapping signals are applied to the switches 201-X and 202-X; these switching signals have a frequency of Fsw.

The VCtank voltage shows a periodic decrease in voltage each time the switches 202-X are closed to discharge the Ctank capacitor 206. The VCmod voltage shows a periodic increase in voltage each time the switches 201-X are closed to charge the Cmod capacitor 205. These increases and decreases are reflected in the voltage Vbal, at the negative input of comparator 210. The Ibal_p and Ibal_n currents are applied to this node to bring the voltages Vbal, VCmod, and VCtank back to the reference voltage Vref after the charge and discharge events.

During the measurement phase, the output of comparator 210 is a sigma-delta modulated stream at output 212 that has a duty cycle described by Equation 1 below:

$$DC = 2 \cdot F_{sw} \cdot \frac{V_{Tx}}{Ibal} \cdot C_m \qquad \text{(Equation 1)}$$

The resulting raw count value indicating the capacitance Cm 204 is described by Equation 2 below:

$$\text{Raw Counts} = DC \cdot N_{res} = 2 \cdot F_{sw} \cdot \frac{V_{Tx}}{Ibal} \cdot N_{res} \cdot C_m \qquad \text{(Equation 2)}$$

In Equations 1 and 2 above, Fsw is the switching frequency of the switches 201-X and 202-X, VTx is the voltage (i.e., VDDA) applied to the Tx node 203, Ibal represents the current (i.e., the absolute value of Ibal_p or Ibal_n) supplied by current sources 208 and 209, and Nres represents the number of clock cycles over which the raw counts are measured. As shown in Equation 2, the raw count value indicating the mutual capacitance Cm depends on Fsw, Ibal, and VTx; thus the measured value for Cm 204 can be affected by noise and other variations in these values.

Figure 3A:
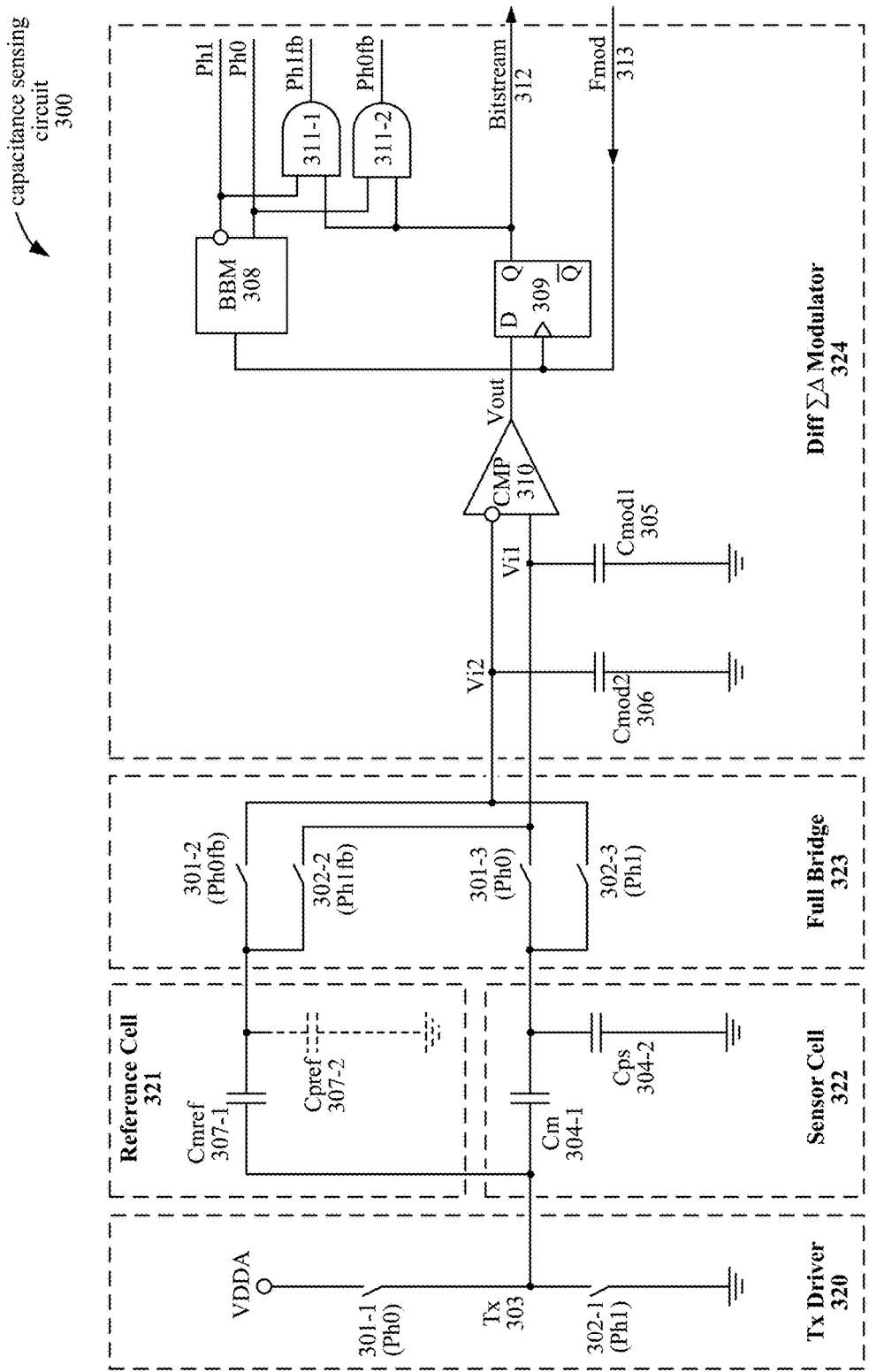
FIG. 3A illustrates an embodiment of a capacitance measurement circuit.

FIG. 3A illustrates an embodiment of a capacitance sensing circuit 300. Capacitance sensing circuit 300 is a ratiometric mutual-capacitance-to-code converter architecture that is insensitive to variations in clock frequency, IDAC current, supply voltage, and reference voltage and has high immunity to external noise.

The capacitance sensing circuit 300 includes a reference cell 321 and a capacitive sensor cell 322. In particular, the capacitive sensor cell 322 represents an intersection between two sensor electrodes in the sensor array 121. Accordingly, mutual capacitance Cm 304-1 of sensor cell 322 represents the capacitance between the two electrodes, while the equivalent parasitic capacitance Cps 304-2 represents the capacitances between the sensor electrodes and ground. In alternative embodiments, the sensor cell 322 may represent a structure other than an intersection between electrodes in array 121; for example, the sensor cell 322 may alternatively represent electrodes in a capacitive button, pressure sensor, or other device in which a mutual capacitance is measured. The reference cell 321 includes a reference mutual capacitor Cmref 307-1, and a reference parasitic capacitance Cpref 307-2. The mutual capacitance Cmref 307-1 of the reference cell 321 is greater than the mutual capacitance Cm 304-1 of the sensor cell 322.

The capacitance sensing circuit 300 includes a transmit (Tx) driver 320 that supplies a Tx signal to each of the reference cell 321 and the sensor cell 322. The Tx driver 320 generates the Tx signal by operating switches 301-1 and 302-2 in a complementary and non-overlapping manner (i.e., the switches 301-1 and 302-2 are operated in a "break-before-make" fashion to provide a deadband between switch closings, and thus are not simultaneously closed at any point in the switching cycle) at a clock frequency Ftx. As a result, the Tx driver output node 303 is alternately switched between a source voltage VDDA and a ground voltage.

The capacitance sensing circuit 300 also includes a full bridge 323 that connects the reference cell 321 and the sensor cell 322 to a first modulation capacitor Cmod1 305 and a second modulation capacitor Cmod2 306 of the differential sigma-delta modulator 324. The full bridge 323 includes a set of bridge switches 301-2, 302-2, 301-3, and 302-3. In particular, switch 301-2 selectively connects the reference cell 321 with the second modulation capacitor Cmod2 306. Switch 302-2 selectively connects the reference cell 321 with the first modulation capacitor Cmod1 305. Switch 301-3 selectively connects the sensor cell 322 with the first modulation capacitor Cmod1 305. Switch 302-3 selectively connects the sensor cell 322 with the second modulation capacitor Cmod2 306. The capacitance sensing circuit 300 has a switching frequency Fsw for operating the bridge 323 switches that is equal to the sensor excitation frequency (i.e., the Tx signal frequency) Ftx for operating the Tx driver 320. Both of the frequencies Fsw and Ftx are generated from modulation frequency Fmod. The bridge 323 operates in two phases: an unbalancing phase and a balancing phase. Over the course of an unbalancing phase, the bridge 323 increases a voltage difference between the first modulation capacitor Cmod1 305 and the second modulation capacitor Cmod2 306. Over the course of a balancing phase, the bridge 323 decreases the voltage difference between Cmod1 305 and Cmod2 306 at a rate corresponding to a difference between the mutual capacitance Cm 304-1 of the sensor cell 322 and the mutual capacitance 307-1 of the reference cell 321.

During the unbalancing phase, the bridge 323 increases the voltage difference between the first and second modulation capacitors Cmod1 305 and Cmod2 306 using the sensor cell 322, while the reference cell 321 remains inactive. The capacitance of the first modulation capacitor Cmod1 305 and the capacitance of the second modulation capacitor Cmod2 306 may each be greater than 100 times a sum of the mutual capacitance Cmref 307-1 and parasitic capacitance Cpref 307-2 of the reference cell 321. Similarly, the capacitance of the first modulation capacitor Cmod1 305 and the capacitance of the second modulation capacitor Cmod2 306 may each be greater than 100 times a sum of the mutual capacitance Cm 304-1 and parasitic capacitance Cps 304-2 of the sensor cell 322. These relationships are expressed in Equations 3-6 below.

$$\frac{C_{mod1}}{C_m + C_{ps}} > 100 \qquad \text{(Equation 3)}$$

$$\frac{C_{mod2}}{C_m + C_{ps}} > 100 \qquad \text{(Equation 4)}$$

$$\frac{C_{mod1}}{C_{mref} + C_{pref}} > 100 \qquad \text{(Equation 5)}$$

$$\frac{C_{mod2}}{C_{mref} + C_{pref}} > 100 \qquad \text{(Equation 6)}$$

The bridge 323 switches in cooperation with the switches 301-1 and 302-1 of the Tx driver 320; specifically, the switches 301-X are opened and closed together, while the switches 302-X are opened and closed together. Accordingly, while an output node 303 of the TX driver 320 is connected to VDDA via switch 301-1, the bridge 323 charges the first modulation capacitor Cmod1 305 by closing the switch 301-3 to connect the sensor cell to Cmod1 305. At this time, the Tx output voltage VDDA is higher than the voltage Vi1 of the Cmod1 305 capacitor, so Vi1 is increased as Cmod1 305 is charged.

While the output node 303 of the TX driver 320 is connected to ground via switch 302-1, the bridge 323 discharges the second modulation capacitor Cmod2 306 by closing the switch 302-3 to connect the sensor cell to Cmod2 306. At this time, the Tx output voltage is lower than the voltage Vi2 of the Cmod2 306 capacitor, so Vi2 is decreased as Cmod2 306 is discharged. At the end of the unbalancing phase, the voltage difference between Cmod1 305 and Cmod2 306 is increased relative to the beginning of the unbalancing phase.

During the balancing phase, the bridge 323 decreases the voltage difference between the first and second modulation capacitors Cmod1 305 and Cmod2 306 using the capacitances of both the sensor cell 322 and the reference cell 321. Accordingly, while the output node 303 of the TX driver 320 is connected to VDDA via switch 301-1, the bridge 323 charges the first modulation capacitor Cmod1 305 by closing the switch 301-3 to connect the sensor cell 322 to Cmod1 305. The switch 301-2 is also closed to connect the reference cell 321 to Cmod2 306 so that Cmod2 306 is charged simultaneously with Cmod1 305. At this time, the Tx output voltage VDDA is higher than both Vi1 and Vi2, so both Vi1 and Vi2 are increased as the respective modulation capacitors Cmod1 305 and Cmod2 306 are charged. While the output node 303 of the TX driver 320 is connected to ground via switch 302-1, the bridge 323 discharges the second modulation capacitor Cmod2 306 by closing the switch 302-3 to connect the sensor cell to Cmod2 306. The switch 302-2 is also closed to connect the reference cell 321 to Cmod1 305 so that Cmod1 305 is discharged simultaneously with Cmod2 306. At this time, the Tx driver 320 output voltage is lower than the voltages Vi1 and Vi2, so Vi1 and Vi2 are decreased as Cmod1 305 and Cmod2 306 are discharged. At the end of the balancing phase, the voltage difference between Cmod1 305 and Cmod2 306 is decreased relative to the beginning of the balancing phase.

The difference between Vi1 and Vi2 decreases over the course of the balancing phase because the mutual capacitance Cmref 307-1 of the reference cell 321 is greater than the mutual capacitance Cm 304-1 of the sensor cell. The voltage difference between the voltage Vi1 of Cmod1 305 and the voltage Vi2 of Cmod2 306 decreases at a rate corresponding to a difference between the mutual capacitance Cm 304-1 of the sensor cell 322 and the mutual capacitance 307-1 of the reference cell 321. Since the larger mutual capacitance Cmref 307-1 is used to charge Cmod2 306 and the smaller mutual capacitance Cm 304-1 is used to discharge Cmod2 306, the charge stored in Cmod2 306 (and therefore the voltage Vi2) increases over time in the balancing phase. Since the larger mutual capacitance Cmref 307-1 is used to discharge Cmod1 305 and the smaller mutual capacitance Cm 304-1 is used to charge Cmod1 305, the charge stored in Cmod1 305 (and therefore the voltage Vi1) decreases over time in the balancing phase.

The modulation capacitors Cmod1 305 and Cmod2 306 in the differential sigma-delta modulator 324 are connected to the positive and negative inputs, respectively, of a comparator 310 that compares the voltages Vi1 and Vi2. The comparator 310 generates an output based on comparing Vi1 and Vi2, and initiates transitions between the unbalancing and balancing phases in response to the comparison. In particular, the comparator generates an output Vout that is asserted high when Vi1 is greater than Vi2. Since the rate at which the voltages Vi1 and Vi2 converge depends on the mutual capacitance Cm 304-1 of the sensor cell 322, the output Vout generated by the comparator 310 reflects the value of the mutual capacitance Cm 304-1 (i.e., the mutual capacitance between a pair of sensor electrodes in the sensor array 121). Since the sensing circuit 300 is differential, common-mode noise can be mitigated by symmetrical routing of the signal paths. The differential sigma-delta modulator 324 includes a D flip-flop 309 that generates an output bitstream 312 based on the output Vout of the comparator 310. The flip-flop 309 is clocked by the clock signal 313 having a frequency Fmod; thus, the output bitstream 312, which is generated at the Q output of the flip-flop 309, is synchronized with the clock signal 313.

The Q output of flip-flop 309 is applied to a sequencer in the differential sigma-delta modulator 324. The sequencer components include a break-before-make (BBM) module 308 and two AND gates 311-1 and 311-2. From the Q output of flip-flop 309 and the clock signal 313, the sequencer generates and outputs a first sequence of switching signals for operating the set of bridge switches 323 during the unbalancing phase, and outputs a second sequence of switching signals for operating the set of bridge switches 323 during the balancing phase.

During the unbalancing phase, the Q output of flip-flop 309 is deasserted so that the outputs of AND gates 311-1 and 311-2 (corresponding to switching signals Ph0*fb* and Ph1*fb*) are deasserted. Switching signals Ph0*fb* and Ph1*fb* control switches 301-2 and 302-2, respectively; therefore, these switches remain open during the unbalancing phase to keep the reference cell 321 disconnected from the Cmod1 305 and Cmod2 306. Meanwhile, the switching signals Ph1 and Ph0 that control the switches 301-3 and 302-3 are generated by the BBM module 308. The BBM module modifies the clock signal 313 to generate Ph0 and Ph1 as two complementary and non-overlapping signals. As such, each of Ph0 and Ph1 is deasserted before the other is asserted, and Ph0 and Ph1 are not asserted simultaneously during any portion of the switching cycle. Since the switches 301-3 and 302-3 are controlled by the switching signals Ph0 and Ph1, respectively, these switches operate during the unbalancing phase to increase the voltage difference between Vi1 and Vi2 as previously described.

During the balancing phase, the Ph0 and Ph1 signals are generated in a similar manner as during the unbalancing phase. However, in contrast with the unbalancing phase, the Q output of the flip-flop 309 is asserted at the inputs of the AND gates 311-2 and 311-1, effectively enabling the Ph0*fb* and Ph1*fb* switching signals. The AND gates 311-1 and 311-2 also each receive input from switching signals Ph1 and Ph0; accordingly, Ph1*fb* is synchronized with Ph1 and Ph0*fb* is synchronized with Ph0. During the balancing phase, the BBM module 308 and AND gates 311-1 and 311-2 generate two pairs of complementary non-overlapping switching signals: (Ph0, Ph1) and (Ph0*fb*, Ph1*fb*) based on the modulation frequency Fmod.

Transitions between the unbalancing phase and the balancing phase are therefore effected in response to the comparison of Vi1 and Vi2 by the comparator 310. When the comparator 310 determines that the Vi1 is greater than Vi2, then its output is asserted. At the next rising clock edge, the flip-flop 309 asserts its Q output, asserting a bit in the bitstream 312 and enabling the Ph0*fb* and Ph1*fb* switching signals. The circuit operates in the balancing phase when the Ph0*fb* and Ph1*fb* switching signals are enabled. When the comparator 310 determines that the Vi1 is less than Vi2, then its output is deasserted. At the next rising clock edge, the flip-flop 309 deasserts its Q output, disabling the Ph0*fb* and Ph1*fb* switching signals. The circuit operates in the unbalancing phase when the Ph0*fb* and Ph1*fb* switching signals are disabled.

Figure 3B:
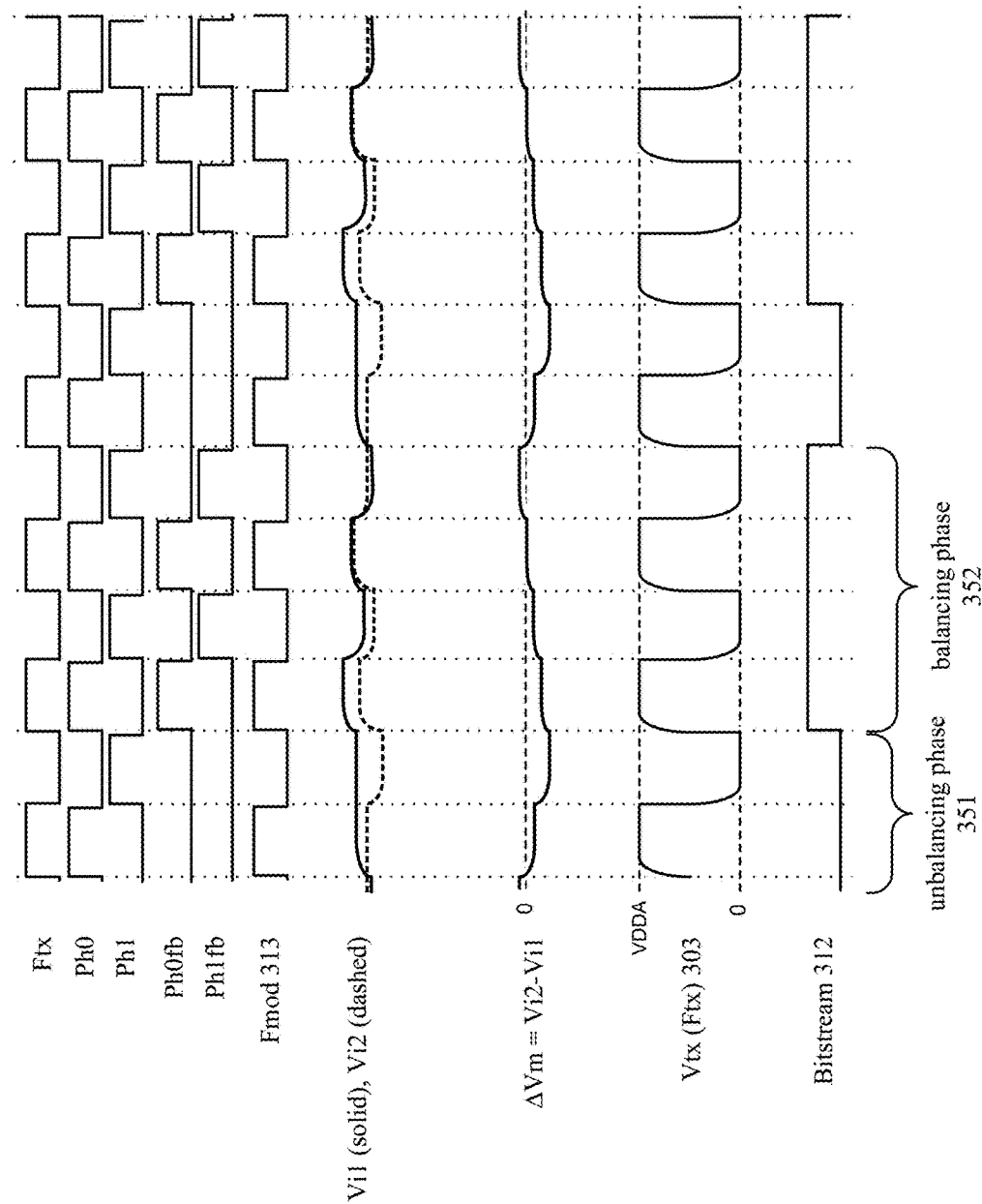
FIG. 3B is a timing diagram illustrating various signals in a capacitance measurement circuit, according to an embodiment.

FIG. 3B is a timing diagram illustrating key signals in the capacitance sensing circuit 300, according to an embodiment. As illustrated in FIG. 3B, the clock signal Fmod and the Tx signal Ftx have the same frequency and are synchronized. The switching signals Ph0, Ph1, Ph0*fb*, and Ph1*fb* are generated by the sequencer components 308, 311-1, and 311-2. As illustrated, during the unbalancing phase 351, Ph0*fb* and Ph1*fb* are kept deasserted. During the balancing phase 352, Ph0*fb* and Ph1*fb* are synchronized with Ph0 and Ph1, respectively.

The voltages Vi1 and Vi2 of the respective modulation capacitors Cmod1 305 and Cmod2 306 are graphed together to illustrate how these signals change relative to each other over the course of the unbalancing phase 351 and balancing phase 352. Vi1 is represented as a solid line and Vi2 is represented as a dashed line. FIG. 3B also illustrates a difference ΔVm that is calculated by subtracting Vi1 from Vi2. When ΔVm is negative, the comparator 310 output Vout is asserted and when ΔVm is positive, the comparator 310 output Vout is deasserted. The change is reflected in the output bitstream 312 at the next rising clock edge applied to the clock input of flip-flop 309.

The resulting output bitstream 312 has an average duty cycle that is substantially proportional to the mutual capacitance Cm 304-1 of the sensor cell. Under the conditions expressed in Equations 3-6 and when Cmref is greater than Cm and Ftx is equal to Fmod, the average duty cycle DC is given by Equation 7 below:

$$DC = \frac{C_m}{C_{mref}}, \text{ where } 0 < DC < 1 \qquad \text{(Equation 7)}$$

The source voltage VDDA and frequency Fmod are not present in Equation 7; thus, the average duty cycle is not affected by variations in these parameters due to noise, environmental factors, etc. Furthermore, mismatch between the capacitances Cmod1 and Cmod2 also does not affect the duty cycle of the resulting output bitstream.

The duty cycle DC can be converted to a raw count value that is suitable for use in processing logic 102. Equation 8 below describes the conversion of the duty cycle to a raw count value.

$$\text{Rawcounts} = DC \cdot N_{res} \qquad \text{(Equation 8)}$$

where $0 < DC < 1$, and $N_{res} = F_{mod} \cdot T_{mea}$

In Equation 8, Fmod is the frequency of the clock signal applied to input 313 and Tmea is the measurement time, or the time over which the raw counts are recorded. Multiplied together, the Fmod and Tmea values define a resolution Nres for the converter circuit. The converter output result is dependent not on the frequency Fmod, but on the number of clock cycles. Accordingly, in alternative embodiments, the clock signal can be spread-spectrum, random, pseudo-random, or a fixed frequency sequence with a fixed number of clocks defined by Nres.

Figure 4A:
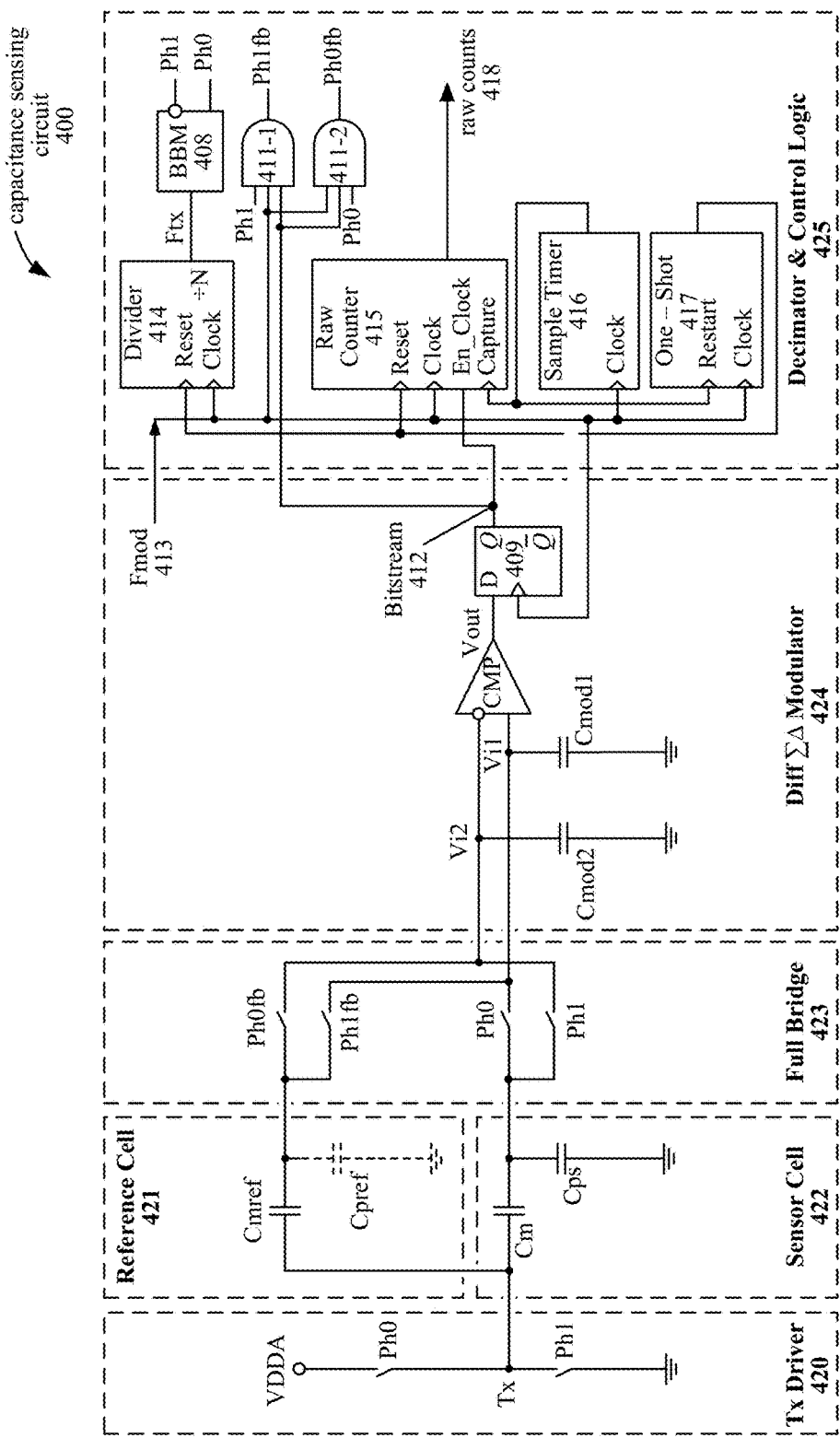
FIG. 4A illustrates an embodiment of a capacitance measurement circuit.

In alternative embodiments, the frequency Fmod can be higher than Ftx in order to increase the resolution Nres of the converter while keeping the measuring time Tmea. FIG. 4A illustrates an embodiment of a capacitance sensing circuit 400 in which the modulation frequency Fmod is higher than the Tx signal frequency Ftx. Similar to the capacitance sensing circuit 300, the capacitance sensing circuit 400 also includes a Tx driver 420, reference cell 421, sensor cell 422, full bridge switches 423, and differential sigma-delta modulator 424. These modules operate in similar fashion as the Tx driver 320, reference cell 321, sensor cell 322, full bridge switches 323, and differential sigma-delta modulator 324, respectively. The capacitance sensing circuit 400 also includes decimator and control logic 425, which generates the Ph0, Ph1, Ph0*fb*, and Ph1*fb* switching signals for the circuit 400.

Clock divider 414 divides the initial clock frequency Fmod by a factor of two to generate Ftx. The complementary non-overlapping switching signals Ph0 and Ph1 are then generated based on Ftx by the BBM module 408. The AND gate 411-1 receives Ph1, Fmod, and the output bitstream 412 as inputs and asserts its output when all these signals are asserted in order to generate Ph1*fb*. Ph0*fb* is similarly generated by AND gate 411-2 based on inputs Ph0, Fmod, and the output bitstream 412.

The average duty cycle DC for the output bitstream 412 is calculated according to Equation 9 as follows:

$$DC = \frac{C_m}{N_{div} \cdot C_{mref}} \text{ where } \qquad \text{(Equation 9)}$$

$0 < DC < 1$ and $F_{mod} = N_{div} \cdot F_{Tx}$

In Equation 9, Cm is the mutual capacitance of the sensor cell 422, Cmref is the mutual capacitance of the reference cell, and Ndiv is the divisor of the divider 414.

The output bitstream 412 is converted to a raw count value 418 by the raw counter 415, sample timer 416, and one-shot module 417. The raw counter 415 receives clock signal 413 at its Clock input. The output bitstream 412 is connected to the clock enable input En_Clock of the raw counter 415 so that clock pulses received at the Clock input are only recorded when the output bitstream 412 is asserted. During a sample period determined by the sample timer 416, raw counter 415 records the number of clock cycles occurring while the output bitstream 412 is asserted. At the end of the sample period, the sample timer 416 asserts the Capture input of the raw counter 415. The raw counter 415 outputs the raw count value 418. At the end of the sample period, the sample timer 416 also triggers the one-shot module 417, which in turn resets divider 414 and raw counter 415. The raw counter 415 can then begin counting clock cycles for the next sample period.

Figure 4B:
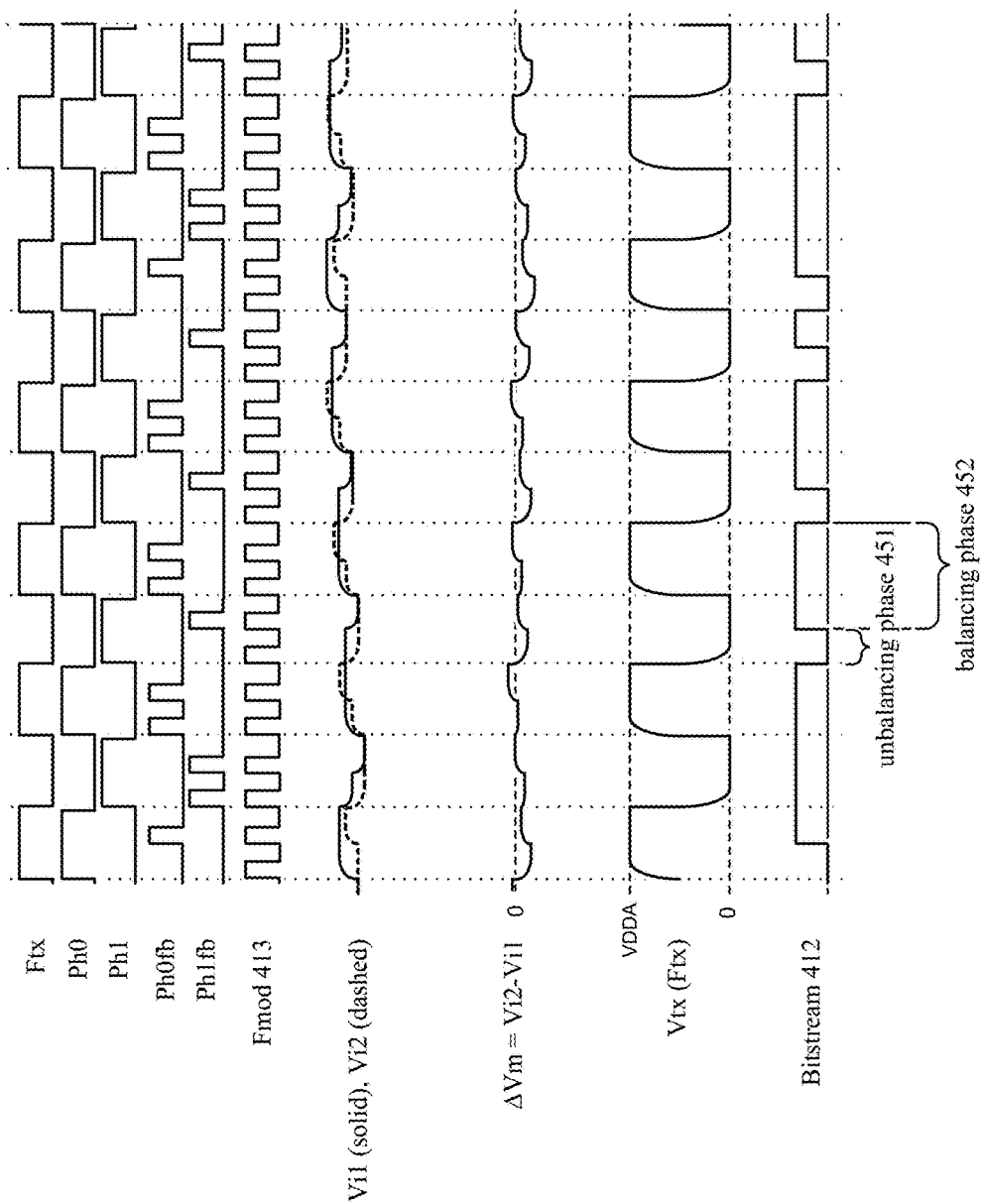
FIG. 4B is a timing diagram illustrating various signals in a capacitance measurement circuit, according to an embodiment.

FIG. 4B is a timing diagram that illustrates key signals in the capacitance sensing circuit 400 when the modulation frequency Fmod is two times as high as the Tx switching frequency Ftx. The Tx switching frequency Ftx is generated by dividing the frequency Fmod by two in the frequency divider 414. As a result, the resulting Ftx frequency is half of the original Fmod frequency, as illustrated in FIG. 4B.

The non-overlapping complementary switching signals Ph0 and Ph1 are generated from the Ftx signal by the positive and negative outputs, respectively, of BBM module 408. Ph0 and Ph1 therefore have the same frequency as Ftx. Switching signals Ph0*fb* and Ph1*fb* are generated by AND gates 411-2 and 411-1, respectively. Ph0/b is asserted when Ph0, Fmod 413, and the output bitstream 412 are all asserted at the input of AND gate 411-2. Ph1/b is similarly generated based on Ph1, Fmod 413, and the output bitstream 412.

The voltages Vi1 and Vi2 are graphed together to illustrate how these signals change relative to each other over the course of the unbalancing phases (e.g., phase 451) and balancing phases (e.g., phase 452). Vi1 is represented as a solid line and Vi2 is represented as a dashed line. FIG. 4B also illustrates a difference ΔVm that is calculated by subtracting Vi1 from Vi2. When ΔVm is negative, the comparator 310 output Vout is asserted and when ΔVm is positive, the comparator 310 output Vout is deasserted. The change is reflected in the output bitstream 412 at the next rising clock edge of Fmod applied to the flip-flop 409. The resulting output bitstream 412 has a duty cycle DC that is substantially proportional to the mutual capacitance Cm of the sensor cell 422.

Figure 5:
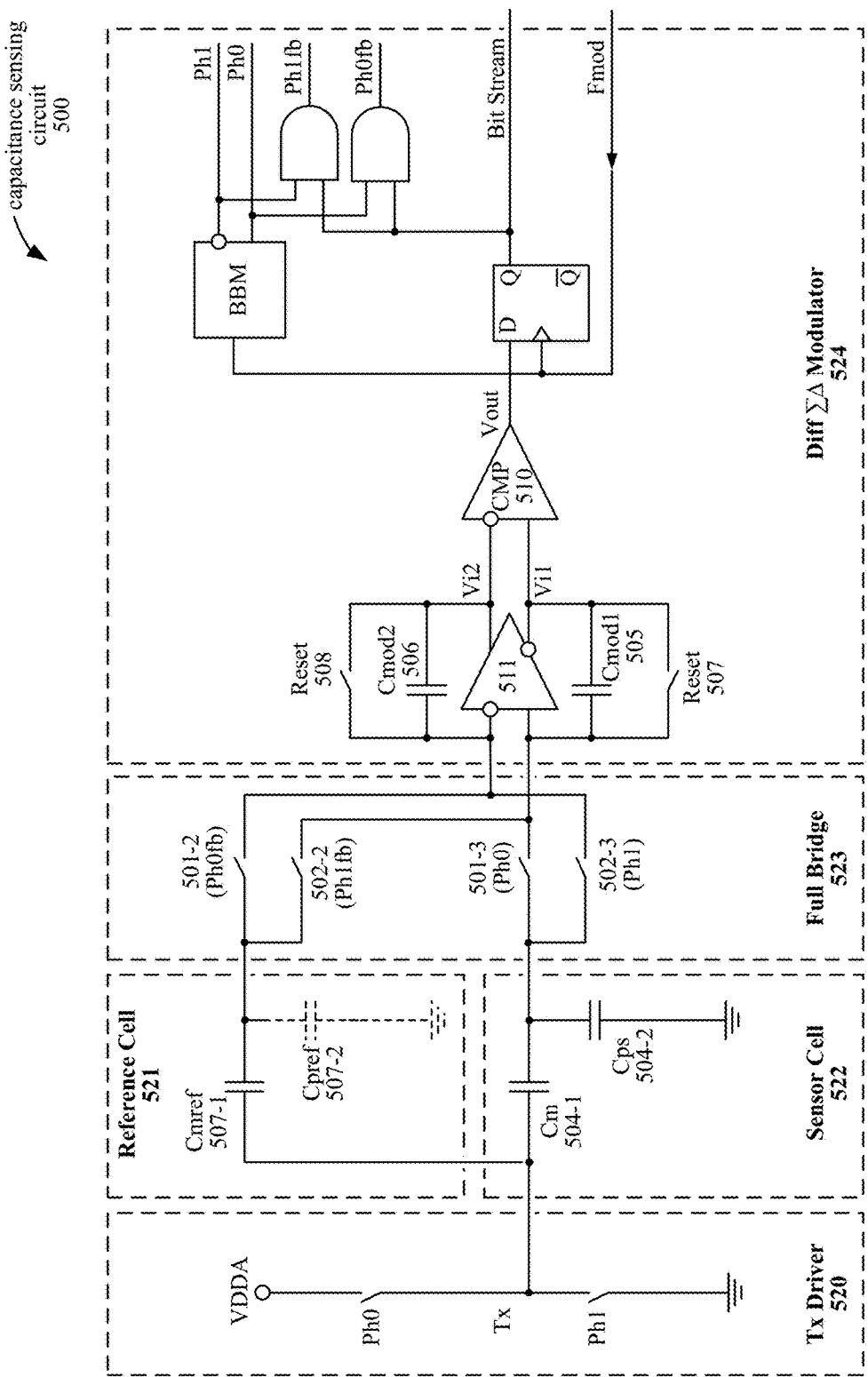
FIG. 5 illustrates an embodiment of a capacitance measurement circuit.

FIG. 5 illustrates an embodiment of a capacitance sensing circuit 500 that implements a ratiometric mutual-capacitance-to-code converter that includes a fully differential integrator circuit. Similar to the capacitance sensing circuit 300, the capacitance sensing circuit 500 also includes a Tx driver 520, reference cell 521, sensor cell 522, full bridge switches 523, and differential sigma-delta modulator 524. These modules operate in similar fashion as the Tx driver 320, reference cell 321, sensor cell 322, full bridge switches 323, and differential sigma-delta modulator 324, respectively.

In the capacitance sensing circuit 500, the modulation capacitors Cmod1 505 and Cmod2 506 are connected in a differential integrator circuit. In particular, Cmod1 505 is connected between a positive input and a negative output of the differential amplifier 511 of the integrator circuit, while Cmod2 506 is connected between a negative input and a positive output of the differential amplifier 511. Capacitors Cmod1 505 and Cmod2 506 are connected in parallel with reset switches 507 and 508, respectively, which can be closed to discharge the capacitors Cmod1 505 and Cmod2 506. The negative input of the differential amplifier 511 is connected to the reference cell 521 via switch 501-2 and the sensor cell 522 via switch 502-3. The positive input of the differential amplifier 511 is connected to the reference cell 521 via switch 502-2 and the sensor cell 522 via switch 501-3. The positive output of differential amplifier 511 is connected to the negative input of comparator 510, while the negative output of differential amplifier 511 is connected to the positive input of the comparator 510.

The incorporation of the modulation capacitors Cmod1 505 and Cmod2 506 into a fully differential integrator circuit allows these capacitors to have much smaller capacitance values as compared to the modulation capacitors Cmod1 305 and Cmod2 306 in sensing circuit 300. For the fully differential integrator implementation, the capacitance of the first modulation capacitor Cmod1 505 and the capacitance of the second modulation capacitor Cmod2 506 are each greater than 2 times a sum of the mutual capacitance Cmref 507-1 and parasitic capacitance Cpref 507-2 of the reference cell 521. Similarly, the capacitance of the first modulation capacitor Cmod1 505 and the capacitance of the second modulation capacitor Cmod2 506 are each greater than 2 times a sum of the mutual capacitance Cm 504-1 and parasitic capacitance Cps 504-2 of the sensor cell 522. These relationships are expressed in Equations 10-13 below.

$$\frac{C_{mod1}}{C_m + C_{ps}} > 2 \quad \text{(Equation 10)}$$

$$\frac{C_{mod2}}{C_m + C_{ps}} > 2 \quad \text{(Equation 11)}$$

$$\frac{C_{mod1}}{C_{mref} + C_{pref}} > 2 \quad \text{(Equation 12)}$$

$$\frac{C_{mod2}}{C_{mref} + C_{pref}} > 2 \quad \text{(Equation 13)}$$

Figure 6:
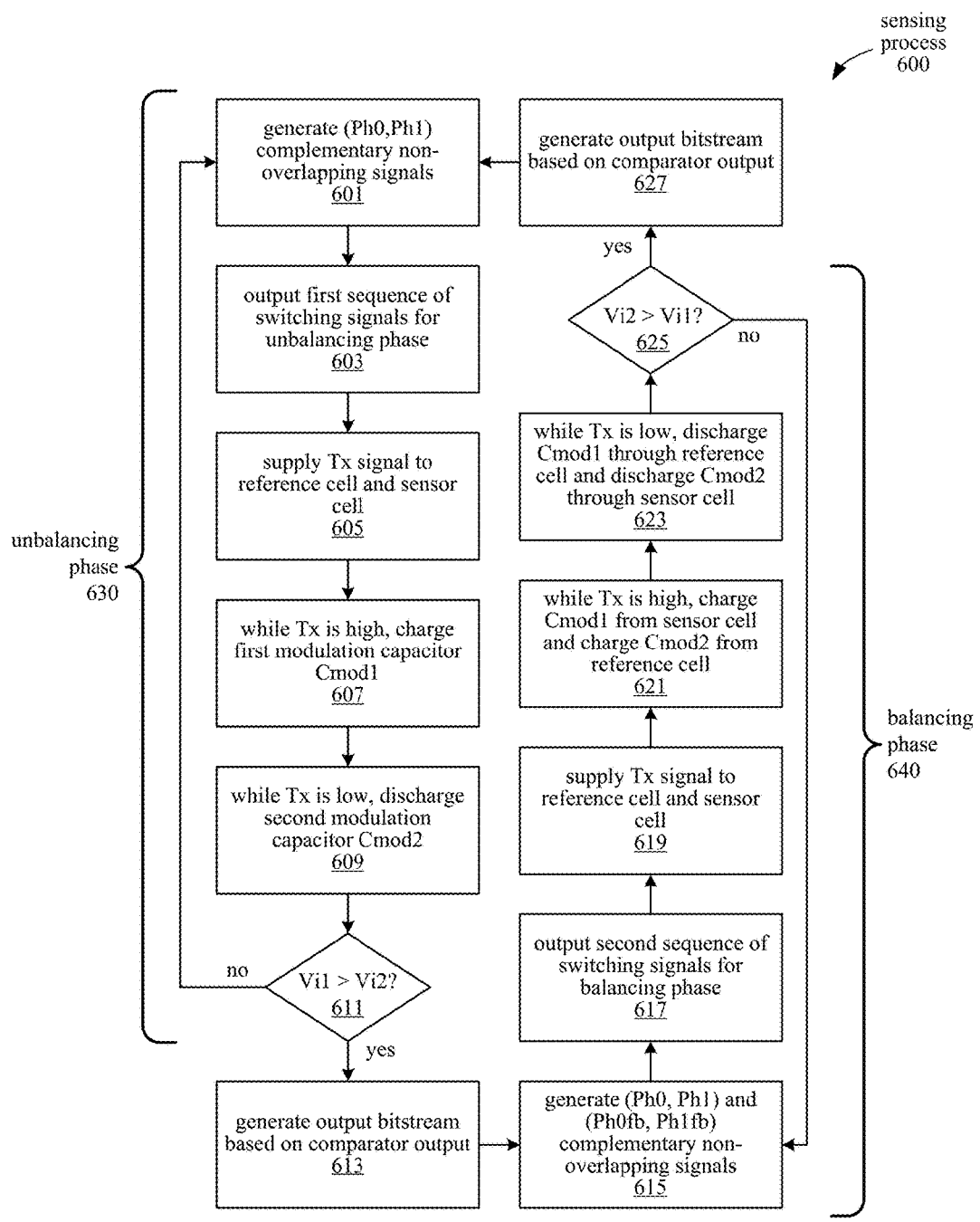
FIG. 6 illustrates a process for measuring a capacitance, according to an embodiment.

FIG. 6 is a flow diagram illustrating a process for sensing a mutual capacitance using a ratiometric mutual-capacitance-to-code converter, according to an embodiment. The operations in the capacitance sensing process 600 are performed in a capacitance sensing circuit such as sensing circuit 300. Alternatively, the process 600 can also be performed by sensing circuit 400 or sensing circuit 500.

In general, the capacitance sensing circuit 300 performing the sensing process 600 alternates between operating in an unbalancing phase 630 and operating in a balancing phase 640. Over the unbalancing phase 630, the sensing circuit 300 increases a voltage difference between a first voltage Vi1 of a first modulation capacitor Cmod1 305 and a second voltage Vi2 of a second modulation capacitor Cmod2 306. From the unbalancing phase 630, the sensing circuit 300 transitions to the balancing phase 640 in response to comparator 310 determining that Vi1 is greater than Vi2. Over the balancing phase 640, the sensing circuit 300 decreases the voltage difference between Vi1 and Vi2 at a rate corresponding to a difference between the mutual capacitance Cm of the sensor cell 322 and the mutual capacitance Cmref of the reference cell 321. From the balancing phase 640, the sensing circuit 300 transitions back to operating in the unbalancing phase 630 in response to the comparator 310 determining that Vi2 is greater than Vi1. The process 600 of charging and discharging the modulation capacitors Cmod1 305 and Cmod2 306 using the reference cell 321 and the sensor cell 322 generates an output bitstream 312 that is proportional to the mutual capacitance Cm of the sensor cell 322.

Specifically, the circuit 300 operating in the unbalancing phase 630 increases the difference between Vi1 and Vi2 by performing the operations of blocks 601-611. At block 601, the sequencer components in the sensing circuit 300 generate the complementary non-overlapping signals Ph0 and Ph1. In particular, Ph0 and Ph1 are generated by the BBM module 308, based on the clock signal 313. BBM module 308 generates a Ph0 signal that is similar to clock signal 313 and a Ph1 signal that is similar to the inverse of clock signal 313, and adds a delay between the time that either of these signals is asserted and the other is deasserted. During the unbalancing phase, the output bitstream 312 is deasserted so that the Ph0/b and Ph1/b switching signals are also deasserted via AND gates 311-1 and 311-2 for the duration of the unbalancing phase.

At block 603, the sequencer (i.e., BBM module 308) outputs the generated sequence of switching signals Ph0 and Ph1 to be used for operating the bridge switches 323 and the Tx driver 320 during the unbalancing phase 630. The switching signals Ph0 and Ph1 are used to control switches 301-1 and 302-1, respectively, of the Tx driver 320, with these switches being closed when their corresponding signals are asserted. The Tx driver output node 303 is thus alternately switched between a high voltage VDDA and a low ground voltage. The Tx driver output node 303 applies the resulting Tx signal to the reference cell 321 and the sensor cell 322, as provided at block 605.

At block 607, when the Tx output node 303 is connected to VDDA, the voltage of the Tx signal is higher than Vi1. During this time, the modulation capacitor Cmod1 305 is charged by closing the bridge switch 301-3. Switch 301-3 is closed due to Ph0 being asserted, and connects the sensor cell 322 to the modulation capacitor Cmod1 305. Switch 302-3 is open due to Ph1 being deasserted. In this configuration, the mutual capacitance Cm 304-1 of the sensor cell 322 and the modulation capacitor Cmod1 305 form a capacitive divider between VDDA and ground, thus charging Cmod1 305 through Cm 304-1.

At block 609, when the Tx output node 303 is connected to ground, the voltage of the Tx signal is lower than Vi2. During this time, the modulation capacitor Cmod2 306 is discharged by closing the bridge switch 302-3. Switch 302-3 is closed due to Ph1 being asserted, and connects the sensor cell 322 to the modulation capacitor Cmod2 306. Switch 301-3 is open due to Ph0 being deasserted. In this configuration, the voltage Vi2 of modulation capacitor Cmod2 306 is coupled to ground through the mutual capacitance Cm 304-1 of the sensor cell 322, thus discharging Cmod2 306 through Cm 304-1.

At block 611, if the comparator 310 determines that Vi1 is not greater than Vi2, the circuit 300 continues back to block 601 to repeat the operations 601-611 of the unbalancing phase 630. At block 611, if the comparator 310 determines that Vi1 is greater than Vi2, the circuit 300 begins to transition from the unbalancing phase 630 to the balancing phase 640. At block 613, the flip-flop 309 receives the comparator 310 output Vout to generates the output bitstream 312. When Vi1 is greater than Vi2, the comparator 310 output Vout is asserted. If the comparator 310 output Vout is asserted when flip-flop 309 is clocked, then flip-flop 309 asserts the output bitstream 312 via its Q output. The flip-flop 309 thus generates the output bitstream based on the comparator 310 output as provided at block 613.

When operating in the balancing phase 640, the circuit 300 decreases the difference between Vi1 and Vi2 at a rate corresponding to a difference between the mutual capacitance Cm 304-1 of the sensor cell 322 and the mutual capacitance Cmref 307-1 of the reference cell 321 by performing the operations of blocks 615-625. At block 615, the sequencer components in the sensing circuit 300 generate two pairs of complementary non-overlapping signals: (Ph0, Ph1) and (Ph0fb, Ph1fb). Ph0 and Ph1 are generated by the BBM module 308, which receives the clock signal 313. BBM module 308 generates a Ph0 signal that is similar to clock signal 313 and a Ph1 signal that is similar to the inverse of clock signal 313, and adds a delay between the time that either of these signals is asserted and the other is deasserted. Ph0fb and Ph1fb are generated by the AND gates 311-2 and 311-1, respectively. During the balancing phase, the output bitstream 312 is asserted so that the Ph0fb and Ph1fb switching signals at the outputs of the AND gates 311-2 and 311-1 are also asserted and deasserted together with Ph0 and Ph1, respectively.

At block 617, the sequencer components (i.e., BBM module 308 and AND gates 311-1 and 311-2) output the generated sequence of switching signals Ph0, Ph1, Ph0fb, and Ph1fb to be used for operating the bridge switches 323 and the Tx driver 320 during the balancing phase 640. The switching signals Ph0 and Ph1 are used to control switches 301-1 and 302-1 respectively, of the Tx driver 320, with these switches being closed when their corresponding signals are asserted. The Tx driver output node 303 is thus alternately connected to a high voltage VDDA and a low ground voltage. The Tx driver output node 303 applies the resulting Tx signal to the reference cell 321 and the sensor cell 322, as provided at block 619.

At block 621, when the Tx output node 303 is connected to VDDA, the voltage of the Tx signal is higher than both Vi1 and Vi2. During this time, the modulation capacitor Cmod1 305 is charged by closing the bridge switch 301-3 while the modulation capacitor Cmod2 306 is charged by closing the bridge switch 301-2. Switches 301-3 and 301-2 are closed due to Ph0 and Ph0fb being asserted. When closed, switch 301-3 connects the sensor cell 322 to capacitor Cmod1 305 and switch 301-2 connects the reference cell to capacitor Cmod2 306. Switches 302-3 and 302-2 are open due to Ph1 and Ph1fb being deasserted. In this configuration, the mutual capacitance Cm 304-1 of the sensor cell 322 and the modulation capacitor Cmod1 305 form a capacitive divider between VDDA and ground, thus charging Cmod1 305 through Cm 304-1. The mutual capacitance Cmref 307-1 of the reference cell 321 and the modulation capacitor Cmod2 306 also form a capacitive divider between VDDA and ground, thus charging Cmod2 306 through Cmref 307-1. Since Cmref is greater than Cm, Cmod2 306 receives a greater amount of charge than Cmod1 305 due to the operations of block 621.

At block 623, when the Tx output node 303 is connected to ground, the voltage of the Tx signal is lower than both Vi1 and Vi2. During this time, the modulation capacitor Cmod1 305 is discharged by closing the bridge switch 302-2 while modulation capacitor Cmod2 306 is discharged by closing the bridge switch 302-3. Switches 302-2 and 302-3 are closed due to Ph1fb and Ph1, respectively, being asserted. Switch 302-2 connects the reference cell 321 to the modulation capacitor Cmod1 305. Switch 302-3 connects the sensor cell 322 to the modulation capacitor Cmod2 306. Switches 301-3 and 301-2 are open due to Ph0 and Ph0fb, respectively, being deasserted. In this configuration, the voltage Vi1 of modulation capacitor Cmod1 305 is coupled to ground through the mutual capacitance Cmref 307-1 of the reference cell 321, thus discharging Cmod1 305 through Cmref 307-1. The voltage Vi2 of modulation capacitor Cmod2 306 is coupled to ground through the mutual capacitance Cm 304-1 of the sensor cell 322, thus discharging Cmod2 306 through Cm 304-1. Since Cmref is greater than Cm, Cmod1 305 loses a greater amount of charge than Cmod2 306 due to the operations of block 623.

At block 625, if the comparator 310 determines that Vi2 is not greater than Vi1, the circuit 300 continues back to block 615 to repeat the operations 615-625 of the balancing phase 640. At block 625, if the comparator 310 determines that Vi2 is greater than Vi1, the circuit 300 begins to transition from the balancing phase 640 to the unbalancing phase 630. At block 627, the flip-flop 309 receives the comparator 310 output Vout to generate the output bitstream 312. When Vi2 is greater than Vi1, the comparator 310 output Vout is deasserted. If the comparator 310 output Vout is deasserted when flip-flop 309 is clocked, then flip-flop 309 deasserts the output bitstream 312 via its Q output. The flip-flop 309 thus generates the output bitstream based on the comparator 310 output as provided at block 627.

The capacitance measurement circuit 300 thus repeats the operations of process 600 in a loop in order to continuously measure the mutual capacitance Cm 304-1 of the sensor cell 322. Although in FIG. 6 the blocks are illustrated in sequence for clarity, it should be understood that in some embodiments at least some of the operations represented in the blocks may be performed concurrently with each other. For example, during the unbalancing phase 630, the operations of blocks 601, 603, 605, and 611 are performed simultaneously with the operations of block 607 or block 609, as these blocks represent operations that are performed concurrently by various circuit elements. Similarly, during the balancing phase 640, the operations of blocks 615, 617, 619, and 625 are performed simultaneously with the operations of block 621 or block 623. The generation of the output bitstream 312, as represented by blocks 613 and 627, can also be performed by the circuit 300 concurrently with the other operations of process 600.

The execution of process 600 by the capacitance measurement circuit 300 results in an output bitstream 312 having a duty cycle that varies proportionally with the mutual capacitance Cm 304-1 of the sensor cell 322 and is independent from clock frequency, current source, and supply and reference voltage variations. In addition, the sensing circuit 300 does not utilize a reference voltage source or current sources, and thus has a reduced power demand as compared to conventional solutions. The differential architecture of circuit 300 also allows mitigation of common mode noise. Capacitance measurement circuits 400 and 500 offer at least similar advantages as circuit 300.

In the foregoing embodiments, various modifications can be made; for example, signals described as being asserted with a high voltage may instead be asserted with a low voltage, or specified components can be replaced with other components having similar functionality. As described herein, conductive electrodes that are "electrically connected" or "electrically coupled" may be coupled such that a relatively low resistance conductive path exists between the conductive electrodes. Quantities, dimensions, or other values described as "substantially" equal may be nominally equal but need not be exactly equal (with variations due to manufacturing tolerances, environmental conditions, quantization or rounding error, and/or other factors), or may be sufficiently close to equal for achieving an intended effect or benefit.

Embodiments described herein include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the claimed subject matter has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitance sensing circuit, comprising:
  a set of bridge switches coupled with a reference cell and a sensor cell, wherein the set of bridge switches is configured to:
    over a first phase, increase a voltage difference between a first modulation capacitor and a second modulation capacitor, and
    over a second phase, decrease the voltage difference at a rate corresponding to a difference between a capacitance of the sensor cell and a capacitance of the reference cell; and
  a comparator configured to:
    generate an output based on comparing a first voltage of the first modulation capacitor with a second voltage of the second modulation capacitor, and
    initiate a transition between the first phase and the second phase in response to the comparing.

2. The capacitance sensing circuit of claim 1, wherein the set of bridge switches comprises a first switch coupling the reference cell with the second modulation capacitor, a second switch coupling the reference cell with the first modulation capacitor, a third switch coupling the sensor cell with the first modulation capacitor, and a fourth switch coupling the sensor cell with the second modulation capacitor.

3. The capacitance sensing circuit of claim 1, further comprising a transmit (TX) driver configured to supply a TX signal to each of the reference cell and the sensor cell.

4. The capacitance sensing circuit of claim 3, wherein the set of bridge switches is further configured to, during the second phase:
  while an output voltage of the TX driver is higher than both of the first voltage and the second voltage, charge the first modulation capacitor by closing the third switch to connect the sensor cell to the first modulation capacitor while simultaneously charging the second modulation capacitor by closing the first switch to connect the reference cell to the second modulation capacitor; and
  while the output voltage of the TX driver is lower than both of the first voltage and the second voltage, discharge the first modulation capacitor by closing the second switch to connect the reference cell to the first modulation capacitor while simultaneously discharging the second modulation capacitor by closing the fourth switch to connect the sensor cell to the second modulation capacitor.

5. The capacitance sensing circuit of claim 1, further comprising a transmit (TX) driver configured to supply a TX signal to the sensor cell, wherein the set of bridge switches is further configured to, during the first phase:
while an output voltage of the TX driver is higher than the first voltage, charge the first modulation capacitor by closing the third switch to connect the sensor cell to the first modulation capacitor; and
while the output voltage of the TX driver is lower than the second voltage, discharge the second modulation capacitor by closing the fourth switch to connect the sensor cell to the second modulation capacitor.

6. The capacitance sensing circuit of claim 1, wherein the capacitance of the reference cell is greater than the capacitance of the sensor cell.

7. The capacitance sensing circuit of claim 1, further comprising a sequencer configured to:
output a first sequence of switching signals for operating the set of bridge switches during the first phase;
transition between the first phase and the second phase in response to the comparing determining that the first voltage is greater than the second voltage;
output a second sequence of switching signals for operating the set of bridge switches during the second phase; and
transition between the second phase and the first phase in response to the comparing determining that the second voltage is greater than the first voltage.

8. The capacitance sensing circuit of claim 7, wherein the sequencer further comprises a break-before-make module configured to generate two pairs of complementary non-overlapping switching signals based on a modulation frequency.

9. The capacitance sensing circuit of claim 8, wherein the TX driver is configured to generate the TX signal by alternately switching a TX driver output between a first voltage and a second voltage at a clock frequency, and wherein the clock frequency is lower than the modulation frequency.

10. The capacitance sensing circuit of claim 1, further comprising a flip-flop configured to generate an output bitstream based on the output of the comparator, wherein an average duty cycle of the output bitstream is substantially proportional to the capacitance of the sensor cell.

11. The capacitance sensing circuit of claim 1, further comprising a fully differential integrator circuit, wherein the first modulation capacitor is connected to a positive input and a negative output of a differential amplifier of the integrator circuit, and the second modulation capacitor is connected between a negative input and a positive output of the differential amplifier.

12. A capacitance sensing method, comprising:
over a first phase, increasing a voltage difference between a first voltage of a first modulation capacitor and a second voltage of a second modulation capacitor;
over a second phase, decreasing the voltage difference at a rate corresponding to a difference between a capacitance of the sensor cell and a capacitance of the reference cell;
comparing the first voltage with the second voltage; and
in response to the comparing, transitioning between the first phase and the second phase.

13. The capacitance sensing method of claim 12, further comprising, during the second phase:
supplying a TX signal to each of the reference cell and the sensor cell,
while a voltage of the TX signal is higher than both of the first voltage and the second voltage, charging the first modulation capacitor by closing the third switch to connect the sensor cell to the first modulation capacitor while simultaneously charging the second modulation capacitor by closing the first switch to connect the reference cell to the second modulation capacitor,
while the voltage of the TX signal is lower than both of the first voltage and the second voltage, discharging the first modulation capacitor by closing the second switch to connect the reference cell to the first modulation capacitor while simultaneously discharging the second modulation capacitor by closing the fourth switch to connect the sensor cell to the second modulation capacitor.

14. The capacitance sensing method of claim 12, further comprising, during the first phase:
supplying a TX signal to the sensor cell;
while a voltage of the TX signal is higher than the first voltage, charging the first modulation capacitor by closing the third switch to connect the sensor cell to the first modulation capacitor; and
while the voltage of the TX signal is lower than the second voltage, discharging the second modulation capacitor by closing the fourth switch to connect the sensor cell to the second modulation capacitor.

15. The capacitance sensing method of claim 12, further comprising:
outputting a first sequence of switching signals for operating the set of bridge switches during the first phase;
transitioning between the first phase and the second phase in response to the comparing determining that the first voltage is greater than the second voltage;
outputting a second sequence of switching signals for operating the set of bridge switches during the second phase; and
transitioning between the second phase and the first phase in response to the comparing determining that the second voltage is greater than the first voltage.

16. The capacitance sensing method of claim 15, further comprising generating two pairs of complementary non-overlapping switching signals based on a modulation frequency.

17. The capacitance sensing method of claim 12, further comprising generating an output bitstream based on the output of the comparator, wherein an average duty cycle of the output bitstream is substantially proportional to the capacitance of the sensor cell.

18. A capacitance sensing system, comprising:
a capacitive sensor cell;
a reference cell;
a transmit (TX) driver configured to supply a TX signal to each of the reference cell and the capacitive sensor cell;
a first modulation capacitor;
a second modulation capacitor;
a set of bridge switches coupled with the reference cell and capacitive sensor cell and configured to:
over a first phase, increase a voltage difference between a first voltage of the first modulation capacitor and a second voltage of the second modulation capacitor, and
over a second phase, decrease the voltage difference at a rate corresponding to a difference between a capacitance of the capacitive sensor cell and a capacitance of the reference cell; and a comparator configured to:
    generate an output based on comparing the first voltage with the second voltage, and
    initiate a transition between the first phase and the second phase in response to the comparing.

19. The capacitance sensing system of claim 18, wherein a capacitance of the first modulation capacitor and a capacitance of the second modulation capacitor are each greater than 100 times a sum of the capacitance of the reference cell and a parasitic capacitance of the reference cell, and wherein the capacitance of the reference cell is greater than the capacitance of the capacitive sensor cell.

20. The capacitance sensing system of claim 18, wherein the capacitive sensor cell comprises a pair of sensor electrodes, and wherein the capacitance of the capacitive sensor cell is a mutual capacitance between the pair of sensor electrodes, and wherein the output generated by the comparator indicates the mutual capacitance between the pair of sensor electrodes.

21. The capacitance sensing system of claim 18, further comprising a flip-flop configured to generate an output bitstream based on the output generated by the comparator, wherein the TX driver is configured to generate the TX signal by alternately switching a TX driver output between a source voltage and a ground voltage at a clock frequency, wherein a duty cycle of the output bitstream is substantially proportional to the capacitance of the sensor cell and is independent from the source voltage and the clock frequency.

* * * * *